June 9, 1925.                                           1,541,077
A. STUBER
FLUID MEASURING APPARATUS
Filed June 26, 1919

WITNESSES:                                    INVENTOR.
                                              Adolph Stuber
                                           BY
                                              his ATTORNEYS.

Patented June 9, 1925.

1,541,077

UNITED STATES PATENT OFFICE.

ADOLPH STUBER, OF ROCHESTER, NEW YORK.

FLUID-MEASURING APPARATUS.

Application filed June 26, 1919. Serial No. 306,976.

*To all whom it may concern:*

Be it known that I, ADOLPH STUBER, of Rochester, county of Monroe, State of New York, have invented certain new and useful Improvements in Fluid-Measuring Apparatus; and I do hereby declare the following to be a clear and exact description of the same, reference being had to the drawings forming a part of this specification and to the reference numerals marked thereon.

My invention has for its object to provide a fluid measuring apparatus by means of which given quantities of fluid may be accurately measured off successively as required and transferred to a receiving chamber from which it may be allowed to flow continuously or be drawn upon intermittently, the reserve supply in the receiving chamber serving to control the rapidity with which the given measured quantities are supplied to said chamber. A further object of my invention is to provide a compact structure adapted to be used as part of the gasoline feed, or liquid fuel system for motor driven vehicles, in which the fuel is drawn from the fuel supply tank by suction into a suitable reservoir and from this supplied to the carburetor. To these and other ends the invention consists in certain improvements and combination of parts as will be hereinafter more fully described, the novel features being pointed out in the claims at the end of the specification.

Figure 1:
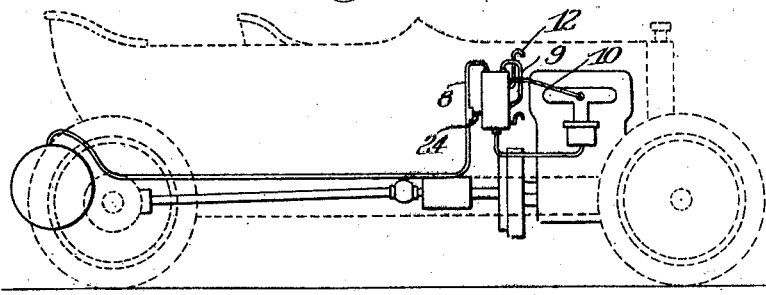
Fig. 1, is a view illustrating generally a fluid measuring apparatus embodying my invention applied to an automobile.

In carrying out my present invention I make use of two communicating chambers having a valve controlled passage between them, one of them comprising a measuring chamber to which is connected a source of fluid supply, the other forming a receiving chamber into which the quantity of fluid, determined by the cubical capacity of the first chamber is discharged when the communicating passage is opened. In conjunction with said chambers I employ an auxiliary receptacle, or cup, containing means such as a float which is moved by fluid passing into the receptacle, and controls the necessary valves when a predetermined quantity of fluid has been supplied to the measuring chamber. The fluid is drawn into the measuring chamber and thence into the receptacle by a partial vacuum created within the chamber casing, and the outlet through which the suction is produced is controlled by a valve head which is arranged to be opened when the valve controlling communication between the measuring and receiving chambers is closed and vice versa, the operation of the two valve heads being controlled by the fluid operated means in the receptacle.

In illustrating the preferred form of my invention I have shown a single casing, which is preferably cylindrical, and comprises a side wall 1, top 2, bottom 3, and interior walls, or partitions, 4 and 5. The latter form chambers at the top, center and bottom of the casing as shown, the sizes of which may, of course, be varied by the relative location of said partitions. The upper chamber indicated by A, constitutes the measuring chamber and is preferably of a size to accommodate a fractional part of a gallon, for instance one-tenth of a gallon, so that each time this chamber is filled and emptied a new quantity is received from the source of supply and discharged into the intermediate receiving chamber B, through the passage $a$, controlled by the valve head $a'$. From this chamber the fluid may flow as required into the lowermost or discharge chamber C, passing thereinto through a pipe 6, having a laterally extending discharge end which is normally closed by a flap or check valve 7.

Leading to the measuring chamber is a supply pipe 8, which preferably discharges through the top wall 2 of the chamber and leading from the latter at the overflow point, in the present instance the top of the chamber, is an overflow passage, or by-pass, indicated by the pipe 9, which also serves as a passage through which the air is withdrawn when a reduction of air pressure, or suction, is created in the receiving chamber B. In the present arrangement of parts the overflow passage 9 is in communication with the receiving chamber B and provision has been made for creating a partial vacuum in the latter by extending therefrom a passage, represented by the pipe 10, which may be connected to any suitable suction producing apparatus. In the present instance the pipe 10 leads to the intake manifold of a hydrocarbon engine, the structural features of which are well understood.

The point at which the pipe 10 communicates with the chamber B is preferably located in the partition 4 adjacent to the passage $a$ and comprises the port $10^a$ with which cooperate the valve head $10^b$. Between ports $a$ and $10^a$ is located a vent 11, from which the pipe 12 extends upwardly to a point above the top of the casing. This vent is controlled by a valve head $11^a$ which is opened when the suction has been shut off by the closing of the valve head $10^b$ against its seat. The valve heads $a'$, $11^a$ and $10^b$ are arranged for simultaneous action by connecting the stems of each to a rocker arm 13, which is pivoted at 14 to a bracket 15 on the under side of the partition 4. The arm operates conjointly with the lever 16 also pivoted at the point 14 and an extensible coil spring 17, connected at its opposite ends to said levers and extending across their common pivot, functions to hold the lever 13, in either of its two positions. When the lever is moved upwardly the ports $a$ and 11 are caused to be opened and port $10^a$ closed, and when it is in its lowered position of adjustment, the positions of said valves are reversed.

In addition to the levers just described additional means is provided for effecting the movement of the valve comprising a receptacle 18, having communication with the measuring chamber, at the overflow point thereof, and containing an element which is operated by fluid passing into the said receptacle and to this end I connect the overflow pipe or by-pass 9 thereto, as indicated at $9^a$. The interior of the receptacle 18 is also in communication with the interior of the chamber B so that any reduction of air pressure in the latter effects a corresponding reduction of pressure in the receptacle and when a partial vacuum is created in the measuring chamber A, it will cause the gasoline or other fluid to be drawn through the supply pipe 8 into said chamber and when the latter is filled, to overflow through the pipe 9 into the receptacle 18. The element operated by fluid in the receptacle is illustrated, in the present instance, as a float 19 having an upwardly projecting stem 20 connected to the arm 21 pivoted to the bracket 22 on the side wall 1 of the casing and connected by the link 23 to the arm 16, whereby when the float is elevated the suction port $10^a$ will be closed by its valve head $10^b$ and the valve head $a'$ will be moved to open the communicating passage $a$, thus allowing the fluid contained in the measuring chamber A to flow into the receiving chamber B.

While the float 19 is held in elevated position, the described position of the valve heads $a'$ and $10^b$ will be maintained, but as it is necessary to reverse the positions of the valve heads periodically, in order to measure successive quantities of fluid, an outlet is provided for the receptacle 18, as indicated by the pipe 24, which drains into the source of fluid supply by opening, as shown, in the present instance, into the pipe 8 where it is covered by a flap valve 25 which serves as a check against the column of fluid in said pipe.

In order that the quantities of fluid supplied to the receiving chamber may be measured off and allowed to flow thereinto only as the fluid is drawn off from the receiving chamber and a predetermined reserve supply of fluid maintained therein at all times, a second element is arranged in the chamber B which, like the float 19, is actuated by the fluid therein for the purpose of controlling the operation of the valve heads $a'$ and $10^b$. This element in the present instance, comprises a float 26 which is connected to the float 19 in any suitable manner whereby these parts rise and fall together. In the present instance this connection is effected by means of rods 27 extending upwardly from the float 26, at opposite sides of the receptacle 18, provided with reversely turned ends, as shown, extending over the upper edge of the side walls of the receptacle and projecting downwardly within the latter to the point of attachment with the top of the float 19. With this arrangement of parts it will be seen that when the float 19 is elevated it will also elevate the float 26, but after the chamber B is filled, through the passage $a$, the float 26 functions to maintain the valve head $a'$ and $11^a$ open and the valve head $10^b$ closed against its port until the quantity of fluid in the chamber B has been nearly exhausted. The outlet pipe 24 is very much smaller than the communicating passage $a$ between the measuring and receiving chambers and consequently the fluid passes from the chamber A into the chamber B with greater rapidity than the small quantity in the receptacle 18 is able to escape. However, as the fluid which is drawn into the receptacle through the overflow pipe 9 eventually flows outwardly and the receptacle is emptied before the fluid in chamber B is exhausted, the float 19 is free to fall with the float 26 so that the former serves as the means for discontinuing the partial vacuum shortly after the measuring chamber A has become filled and the latter serves to maintain this condition until the fluid in the measuring chamber falls below a predetermined level. As this occurs the valve 10ª is opened and 11ª and a' are closed to allow a partial vacuum to be recreated within the chamber B and receptacle 18.

The chamber C serves as an auxiliary storage receptacle which is always filled and from which fluid may be drawn during the time that the measuring chamber is being filled, the check valve 7 on the pipe 6 preventing the reduction of air pressure in the receiving chamber from exerting any influence upon the body of the fluid contained in the chamber C.

One use to which the invention has been successfully applied is in conjunction with a registering mechanism as indicated at 35, Figure 1, for counting and indicating the number of times the measuring chamber is filled and emptied. The registering mechanism shown in the present instance is a variety particularly adapted for use on the instrument board of a motor vehicle for indicating the amount of fuel consumed, and also the ratio of work done or miles accomplished for each unit of fuel consumed. Such a mechanism is fully shown and described in Letters Patent No. 1,410,772 granted to me March 28, 1922, for Registering mechanisms so that a description of the details thereof herein appears superfluous. The measuring chamber of the present apparatus may be connected with such a registering mechanism by a small pipe 36, Figure 1, for transmitting variations in pressure to an actuating means in the registering mechanism such as a movable piston, while for driving the registering mechanism to indicate the ratio of miles travelled to fuel consumed, there is provided a flexible rotary shaft indicated generally at 37 as driven by a gearing connection as shown with the main shaft of the vehicle.

Figures 2, 3:
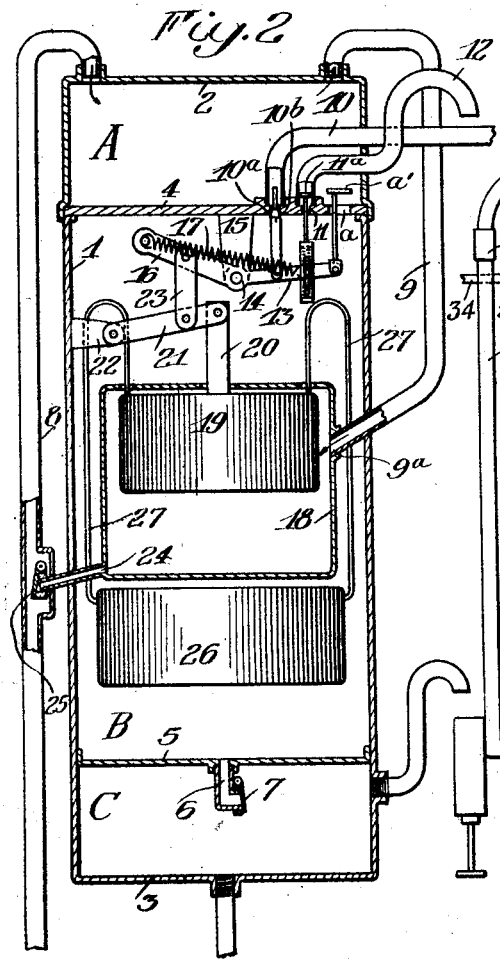
Fig. 2, is an enlarged sectional view of a fluid measuring apparatus showing one embodiment of the invention.
Fig. 3, is a similar view of a modification of the apparatus. Similar reference numerals in the several views indicate similar parts.

In operation, assuming the parts to be in the position shown in Figure 2, consumption of fuel will cause the level of the liquid in the compartments B and C to be gradually lowered. As the floats thereby descend and approach their lowermost positions, the valves in the partition 4 will be suddenly reversed. Suction from the source through the pipe 10 will then be transmitted through the chamber B, by-pass 9, and chamber A to the supply pipe 8, and will cause the chamber A to become filled from the main supply tank, and overflow into the receptacle 18, causing the float 19 to rise. When this float reaches its uppermost position it will again reverse the valves, restoring the parts to the position illustrated, ready for a succeeding operation.

The means disclosed herein for controlling the flow of fluid from the measuring chamber into the receiving chamber is equally capable of utilization when the arrangement of parts is such that fluid flows from the supply source to the measuring chamber by gravity. In Fig. 3, I have shown the same arrangement of parts as previously described with the following exceptions, the supply pipe 8ª discharges into the bottom of the measuring chamber A' and is provided therein with a valve 8ᶜ which is alternately opened and closed by the floats 19ª and 26ª in the receptacle 18ª and the measuring chamber B' respectively. The communicating passage between the measuring chamber and the receiving chamber in this structure is controlled by the valve a'', which it will be understood is open when the valve 8ᶜ is closed and vice versa. With this arrangement of parts the fluid after it has filled the measuring chamber A', or reaches the overflow point thereof, passes through the pipe 9ª into the receptacle 18ª from which it flows through the restricted passage 24ª into a suitable closed receptacle 30. After the latter has become filled the liquid may be either drained off or expelled from the chamber by pumping it back into the source of supply through a pipe 31 connected directly with the pipe 8ª and provided with a check valve 32.

The modification of the invention in which the fuel flows by gravity from the main supply tank is adapted for use with a registering mechanism as described in connection with the preferred form of the invention. In this modification, however, the rise and fall of the float means corresponding to the filling and emptying of the measuring chamber is transmitted to the registering mechanism for actuating the latter by an electrical device comprising a switch such as shown and described in Reissue Letters Patent No. 15,651, granted to me July 10, 1923, for Fluid measuring and indicating mechanisms, which Letters Patent also show and describe another form of registering mechanism with which the present apparatus may be employed. In this modification one of the float rods 27 is provided with a cam 33 adapted to cooperate with a spring actuated rod 34 slidably carried in an opening in the wall of the tank and in a supporting bracket 35ª on the exterior of the latter, the outer end of the rod being arranged, during the rise and fall of the float, to operate a suitable switch as in said Reissue Patent No. 15,651. It is evident, however, that the present invention is adapted for application to motors other than those for driving vehicles, and for use in conjunction with other forms of registering mechanism.

I claim as my invention:

1. The combination with a measuring chamber having a source of fluid supply connected thereto, a receiving chamber in communication therewith and a valve controlling said communication, of a receptacle having communication with the measuring chamber, means for opening and closing the valve controlled by fluid in the receptacle and means for creating a partial vacuum in the receptacle to draw fluid into the measuring chamber and thence into the receptacle.

2. The combination with two communicating chambers, one having a source of fluid supply connected thereto and serving as a measuring chamber, the other serving as a receiving chamber and a valve normally closing communication between the two chambers, of a receptacle in the receiving chamber having communication with the measuring chamber at the overflow point of said measuring chamber, means for opening and closing said valve controlled by fluid in the receptacle and means for creating a partial vacuum in the receptacle to cause fluid to be drawn into the measuring chamber and thence into the receptacle.

3. The combination with a measuring chamber and a receiving chamber, said chambers having a communicating passage, a receptacle and a feed passage leading to the receptacle from the measuring chamber, of a source of fluid supply for the measuring chamber, valves controlling the flow of fluid into the latter and its passage from the measuring chamber into the receiving chamber, and float means in the receptacle for alternately opening and closing said valves.

4. The combination with a measuring chamber, a receiving chamber in communication with and below the latter, a receptacle and an overflow passage leading to said receptacle from the measuring chamber, of a source of fluid supply leading to the latter, valves controlling the passage of fluid into the measuring chamber and its flow from the latter into the receiving chamber, and means controlled by fluid in the receptacle for alternately opening and closing the valves.

5. The combination with two communicating chambers, one comprising a measuring chamber and provided with an overflow, the other a receiving chamber and provided with an outlet, a receptacle having an outlet and arranged to receive fluid from said overflow, and a source of fluid supply leading to the measuring chamber, of two valves, one for controlling the passage of fluid into the measuring chamber, the other controlling its flow from said measuring chamber into the receiving chamber, operating devices for alternately opening and closing said valves, and float means located in the receptacle and the receiving chamber working conjointly to actuate and maintain said operating devices in position to discontinue the fluid supply to the measuring chamber and open communication therefrom to the receiving chamber when the receptacle is filled, and while the measured quantity of fluid remains in the receiving chamber.

6. The combination with two communicating chambers, one comprising a measuring chamber and provided with an overflow, the other a receiving chamber and provided with an outlet, a receptacle having an outlet and arranged to receive fluid from said overflow, and a source of fluid supply leading to the measuring chamber, of two valves, one for controlling the passage of fluid into the measuring chamber, the other controlling its flow from said measuring chamber into the receiving chamber, and operating devices for alternately opening and closing said valves and comprises floats located in the receptacle and in the receiving chamber.

7. The combination with two communicating chambers, one comprising a measuring chamber and provided with an overflow, the other a receiving chamber and provided with an outlet, a receptacle having an outlet and arranged to receive fluid from said overflow, and a source of fluid supply leading to the measuring chamber, of two valves, one for controlling the passage of fluid into the measuring chamber, the other controlling its flow from said measuring chamber into the receiving chamber, and operating devices for alternately opening and closing said valves and including two connected floats, one located in the receptacle for actuating the valve operating devices to shut off the supply of fluid to the measuring chamber and open communication between the latter and the receiving chamber and the other located in the receiving chamber and serving to first maintain the valve operating devices in the described position and subsequently when the receiving chamber is emptied, to reverse them.

8. The combination with a measuring chamber having a source of fluid supply and provided with an overflow, a receiving chamber having communication with the measuring chamber, a receptacle communicating with the measuring chamber through said overflow, of means for producing a partial vacuum in the receptacle comprising a passage leading to a source of vacuum and having a valve seat, a valve head cooperating therewith, a second valve head controlling the communication between the two chambers, and operating devices for alternately moving said heads into open and closed position and comprising means controlled by the passage of fluid into said receptacle for actuating the operating devices in one direction.

9. The combination with a measuring chamber having a source of fluid supply and provided with an overflow, a receiving chamber having communication with the measuring chamber and provided with an outlet, a receptacle communicating with the measuring chamber through said overflow and having an outlet, of means for producing a partial vacuum in the receptacle comprising a passage leading to a source of vacuum and having a valve seat, a valve head cooperating therewith, a second valve head controlling the communication between the two machines, means moved by the change of level of the fluid in the receptacle for actuating the valve heads to shut off the vacuum producing means and open communication between the chambers and other means operated by the change of level of the fluid in the receiving chamber for maintaining said valves in the position described and subsequently reversing the position of said valves when the fluid is drawn from the receiving chamber.

10. The combination with a measuring chamber, a source of fluid supply, therefor, a receiving chamber having an outlet, said measuring chamber having an outlet passage leading to the receiving chamber, a valve head controlling said outlet passage and a receptacle in said receiving chamber having an outlet passage, of an overflow pipe leading from the measuring chamber to the receptacle, means for producing a partial vacuum in the receptacle comprising a passage leading to a source of vacuum and provided with a valve head cooperating therewith, means for operating the two valve heads to alternately open and close said respective passages including a float in the receptacle for actuating said operating means to cause the vacuum passage to be closed when said outlet passage of the measuring chamber is opened and a float in the receiving chamber serving to maintain the valve heads in the position described during the presence of a given quantity of fluid in the receiving chamber and to operate them into a reverse position when a portion of the fluid in said chamber has flowed therefrom.

11. The combination with a measuring chamber, a receiving chamber in communication therewith, a valve head controlling said communication, and a source of fluid supply leading to the measuring chamber, of a receptacle having an outlet discharging into the supply source, a by-pass supplying fluid to the receptacle from the measuring chamber and means for producing a partial vacuum in the receptacle comprising a passage leading to a source of vacuum and provided with a valve port having a cooperating valve head, means connecting the valve heads whereby they are opened and closed in alternation, and means operated when a given quantity of fluid has entered the receptacle to effect a closing of the vacuum port and the corresponding opening of the communicating passage between the two chambers.

12. The combination with a measuring chamber, a receiving chamber, said chambers having a communicating passage, a valve head controlling the passage, a source of fluid supply comprising a supply passage leading to the measuring chamber, a receptacle having a trapped outlet discharging into the supply passage and a by-pass leading from the overflow point of the measuring chamber to said receptacle, of means for producing a partial vacuum in the receptacle comprising a passage leading to a source of vacuum and provided with a valve port having a valve head, the latter being adapted to be closed when the first mentioned valve head is open and vice versa, means operated by fluid supplied to the receptacle to effect a closing of the vacuum port and the corresponding opening of the communicating passage between two chambers and other means operated by the fluid in the receiving chamber to temporarily maintain said condition of the parts.

13. The combination with a measuring chamber, a receiving chamber, said chambers having a communicating passage, and a valve head controlling the passage, a source of fluid supply comprising a supply passage leading to the measuring chamber, a receptacle within the receiving chamber having a trapped outlet discharging into the fluid supply passage and a by-pass leading from the measuring chamber to said receptacle having a greater cross sectional area throughout than that of the receptacle outlet, of means for producing a partial vacuum in the receptacle comprising a passage leading to a source of vacuum and provided with a valve port having a cooperating valve head, means for controlling the two valve heads serving to alternately open one and close the other, a float in the receptacle and a second float in the receiving chamber and means whereby both of said floats are operatively connected to the valve controlling means.

14. The combination with a casing having a transverse partition dividing it into an upper measuring chamber and a lower chamber, said partition having a discharge opening, a valve head for closing the latter and means for producing a partial vacuum in the receiving chamber comprising a passage leading to a source of vacuum and provided with a port opening therein at the underside of the partition and having a valve head, means for operating said valve heads to alternately open and close them, of a source of fluid supply embodying a passage leading to the measuring chamber, a receptacle located in the receiving chamber having an outlet discharging into the supply, a by-pass leading from the measuring chamber to the receptacle, separate means in the receptacle and receiving chamber operated by fluid in said receptacle and chamber respectively and conjointly controlling the valve operating means to close the vacuum port and open the discharge passage when the measuring chamber is filled and after the fluid has passed therefrom into the receiving chamber and operating to hold said valves in the position described and subsequently to reverse their position when the fluid level in the receiving chamber falls below a given point.

15. The combination of a measuring chamber, a source of fluid connected therewith, a receiving chamber in communication with said measuring chamber, a valve controlling the communication between the chambers, a receptacle, an overflow outlet for said measuring chamber leading to said receptacle, means for creating a partial vacuum in said receptacle to draw fluid into said measuring chamber and thence into said receptacle, and means comprising a float in said receptacle for controlling said valve to admit measured quantities of fluid from said measuring chamber into said receiving chamber.

16. The combination of a measuring chamber, a source of fluid connected therewith, an atmospheric connection for said measuring chamber, a receiving chamber in communication with said measuring chamber, a valve controlling the communication between the chambers, a valve controlling said atmospheric connection, a receptacle, an overflow outlet for said measuring chamber leading to said receptacle, means for creating a partial vacuum in said receptacle to draw fluid into said measuring chamber and thence into said receptacle, and means comprising a float in said receptacle for controlling said valves to relieve said vacuum and admit measured quantities of fluid from said measuring chamber into said receiving chamber.

ADOLPH STUBER.